Figure 1:
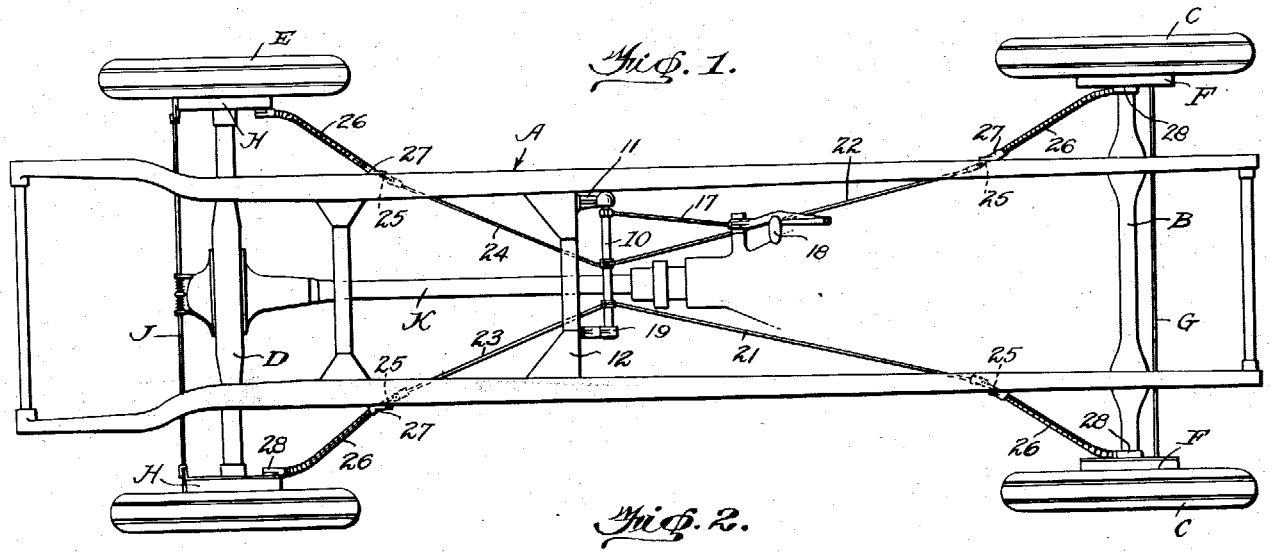

G. L. SMITH

Sept. 3, 1929. FOUR-WHEEL BRAKE SYSTEM Re. 17,426

2 Sheets-Sheet 1

Original Filed Dec. 22, 1924

Inventor
George L. Smith,
by Bright & Bailey
Attorneys

G. L. SMITH

Sept. 3, 1929. FOUR-WHEEL BRAKE SYSTEM Re. 17,426

2 Sheets-Sheet 2

Original Filed Dec. 22, 1924

Inventor
George L. Smith,
by Bright & Bailey
Attorneys

Reissued Sept. 3, 1929 Re. 17,426

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

FOUR-WHEEL-BRAKE SYSTEM.

Original No. 1,598,661, dated September 7, 1926, Serial No. 757,511, filed December 22, 1924. Application for reissue filed December 30, 1927. Serial No. 243,685.

My present invention relates to four-wheel brake systems for automobiles and has particular reference to improvements in means for distributing braking force from an operator to the front and rear brakes of such system.

My invention is adapted for advantageous use in connection with four-wheel brake systems in which the rear and front brakes are provided respectively with the braking effect equalizing mechanisms described and claimed in my prior Patents 1,440,842 January 2, 1923, and 1,490,642, April 15, 1924, and I will disclose my invention as applied to such a brake system.

To obtain the maximum efficiency of my aforesaid equalizing mechanisms between the right and left brakes it is essential that First, the proportion between the front and rear brake pressures must be susceptible of accurate control and regulation.

Second, the transmission of power to produce the brake pressures on one side must be as positive as it is for the other side.

This latter requirement is not fulfilled in mechanisms employing long operating shafting where a very short length of shafting is in torsion on one side and a long length in torsion on other side. In some mechanisms in use this torsional loss is four or five times greater on one side than on the other with the result that the clamping of the brake on the weak side is correspondingly less positive. Furthermore, considerable angular movement of the foot pedal is wasted in taking up this torsion before effective application of the brake is reached.

It is therefore the purpose of my present invention to provide an improved means for distributing braking force from an operator to the front and rear brakes of a four wheel brake system which will attain the essentials heretofore enumerated.

With this and other objects in view the invention consists in the details of construction and the arrangement and combination of parts to be hereinafter more fully described.

In the drawings chosen to illustrate my invention, the scope whereof is set forth in the claims—

Figure 2:
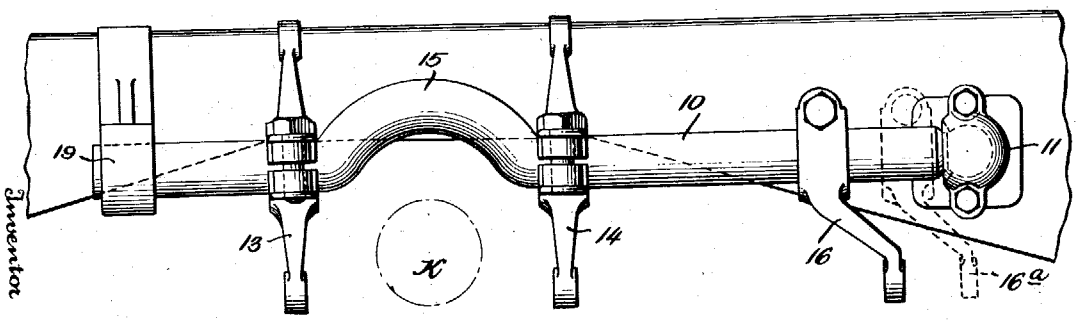
Figure 3:
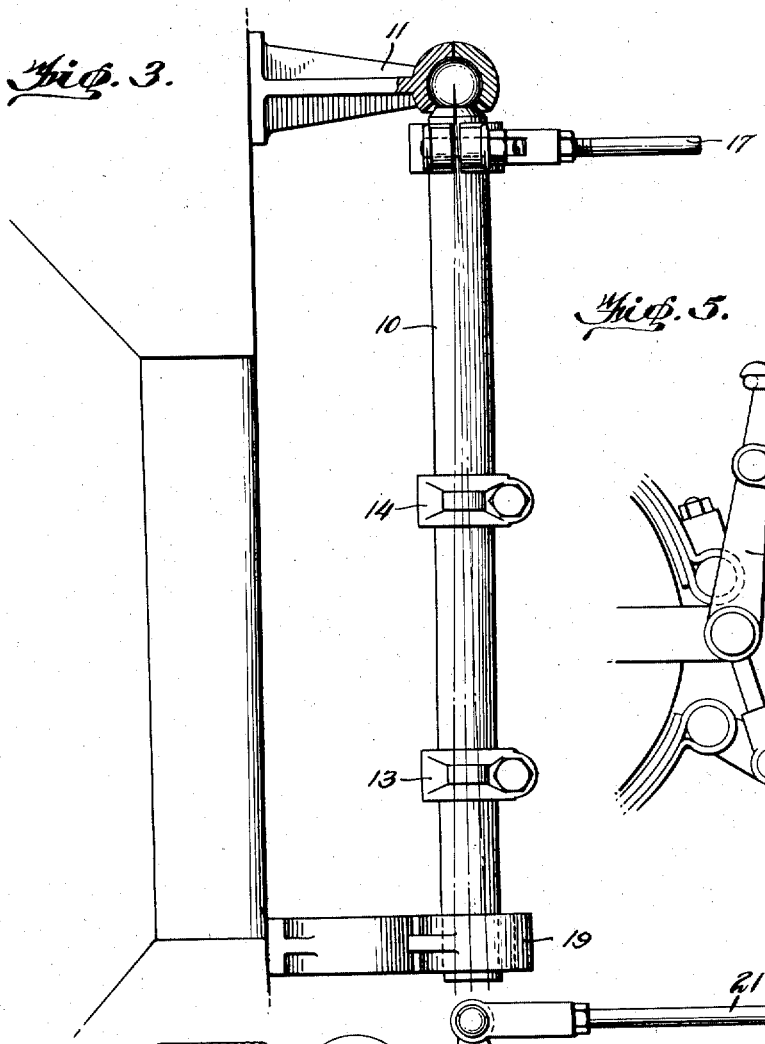
Figure 5:
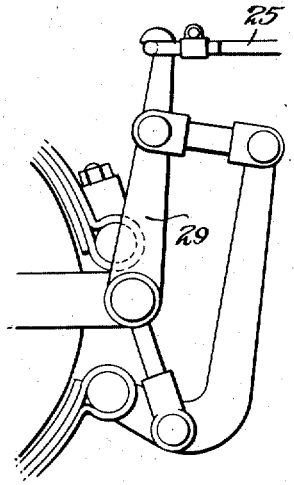
Figure 4:
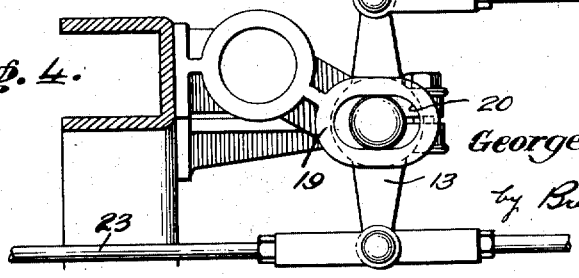

Figure 1 is a plan view of a four-wheel brake system for automobiles embodying my invention;

Figure 2, a view in front elevation disclosing the force distributing shaft of the system and the mountings of said shaft;

Figure 3, a plan view partly in section of what is shown in Figure 2;

Figure 4, an end view of Figure 3 with the tension members of the system shown connected with the force distributing shaft; and Figure 5, a detail view showing one manner of connecting a tension member of the system with the brake toggle construction embodied in my prior Patent 1,440,842.

Referring to the drawings A indicates generally the chassis of an automobile, B the front axle, C the front wheels, D the rear axle and E the rear wheels. The front wheels C are each provided with brakes F having associated therewith the braking effect equalizing mechanism disclosed and claimed in my prior Patent 1,490,642 and of which mechanism the equalizing rod G is visible. Likewise the rear wheels E are each provided with brakes H having associated therewith the braking effect equalizing mechanism disclosed and claimed in my prior Patent 1,440,842 and of which mechanism the equalizing rod J is visible.

In carrying my invention into practice I employ a force distributing cross shaft 10 mounted at one end in a bracket 11 which is secured to a cross member 12 of the chassis frame A. This mounting is in the form of a ball and socket joint to permit the shaft both to swing and rotate. This shaft 10 carries two rocker arms 13 and 14, the ends of which extend both upwardly and downwardly and said rocker arms are spaced on either side of the propeller shaft K of the automobile, it being noted that the upper and lower portions of the rocker arms 13 and 14 are of equal length. The force distributing shaft 10 is provided with a curved portion 15, so as to secure proper clearance between said force distributing shaft and the propeller shaft of the automobile. Another arm 16 is mounted on the shaft 10 and extends downwardly, said arm being connected by a rod 17 to the foot pedal 18.

The free end of the shaft 10 is carried by a bracket 19, the latter being bolted to the cross member 12. The bracket 19 embodies an elongated slot 20 which supports the free end of the shaft 10 and permits said shaft to swing in a horizontal plane about the center of the ball joint bearing in the bracket 11. To the upper portions of the rocker arms 13 and 14, rods 21 and 22 are connected and these rods respectively extend forwardly and outwardly to the front brakes F. To the lower portions of the rocker arms 13 and 14 rods 23 and 24 are connected and these latter rods respectively extend rearwardly and outwardly to the rear brakes H. The outer ends of the rods 21, 22, 23 and 24 are respectively connected to wire cables 25 carried in flexible casings 26. These casings are connected at their inner ends to the adjacent side members of the chassis frame A by suitable tabs 27 and at their outer ends by the tabs 28 to fixed parts of the brake mechanism adjacent thereto. The outer ends of the wire cables 25 are connected to the usual operative portions of the brake mechanisms F and H for effecting application of the four brakes. In Figure 5 I have illustrated one method of connecting a wire 25 with the brake toggle embodied in my prior Patent 1,440,842. In this arrangement it is only necessary to extend the lever 29 of the brake setting mechanism and secure the wire 25 to the extension in the manner shown.

My invention also contemplates the provision of means for resisting the application of braking force to the brakes F of the front wheels C when turning and this is accomplished by the employment of the flexible casings 26 and the wires 25 in the following manner.

The casings 26 are nearly straight when the front wheels are straight, therefore the friction of the wires 25 in their casings 26 due to the curves in the latter is a minimum. When the wheels C are turned through an angle to steer the vehicle in a curved path the casings 26 will be given greater curvature depending upon the extent of angular movement of the wheels C and it necessarily follows that the side wall friction between casings 26 and their wires 25 will be correspondingly increased. Consequently the force transmitted to the rods 21 and 22 in setting the front brakes will be partially used up in overcoming this friction when turning corners with the result that less power is available for setting these brakes. Moreover this loss of power increases with the sharpness of the curve which the vehicle makes and the danger of a front wheel skid is practically eliminated, whereas in the rear this frictional loss does not enter, since the wheels do not have any turning movement except on their axles.

The action of the mechanism is as follows: When the pedal 18 is depressed the rod 17 is placed in tension and through the action of the lever 16 a rotative force is imparted to the shaft 10. This force is imparted through the rocker arms 13 and 14 to the operating rods 21, 22, 23 and 24, those for the front brakes being pulled rearwardly and those for the rear brakes being pulled forwardly and the brakes are thus applied through the wire connections 25 to the various brake mechanisms. Since the shaft 10 can swing freely in the slot 20, it will move in one direction or the other until the total tension on the rods 21 and 22 equals the total tension on the rods 23 and 24 minus an amount dependent upon the action of the rod 17 in swinging the shaft 10 forwardly. With the lower end of the arm 16 positioned directly below the center of the ball and socket joint as shown at $16^a$ in dotted lines for instance, the effect of this tension in the rod 17 on the equalization of the front and rear forces would be zero and by moving this arm 16 inwardly on the shaft 10 any desired proportion between front and rear forces for applying the brakes can be obtained without any change in levers or other connections. This proportion thus becomes a matter of adjustment only and the connection between the shaft 10 and arm 16 is such as to permit the desired adjustment.

Referring to Fig. 2 it is apparent that were it possible to utilize one rocker arm in place of the two rocker arms 13 and 14 and placed half way between them the equalizing action would be more simple and more accurate and the amount of shafting in torsion would be equal for right and left sides. This is usually impracticable, however, owing to interference with the propeller shaft K. With two rocker arms spaced as shown in Fig. 2 the variation in take up on the rods 21, 22, 23 and 24 produced by any swinging movement of the shaft 10 is small, however, and is easily compensated by a slight movement of my equalizing mechanism between right and left brakes described in my aforesaid Letters Patent. Furthermore, the torsional loss of the right hand side of the system over the left hand side is also small, since the length of shafting between the levers 13 and 14 is short.

I claim:

1. In a brake system, a pair of brakes, a rotatable and swingable shaft, connections between said shaft and said brakes, and means operating through said shaft to apply the brakes, said means including a connection with the shaft adjustable along the latter.

2. In a brake mechanism for vehicles, a pair of front wheel brakes, a pair of rear wheel brakes, a single shaft between said front and rear pairs of brakes, a fixed bearing supporting said shaft for axial rotation and pivotal movements and holding same against all other movements with respect thereto, connections between said shaft and the front pair of brakes, connections between said shaft and the rear pair of brakes, and means for rotating said shaft to apply the brakes.

3. In a brake mechanism for vehicles, a pair of front wheel brakes, a pair of rear wheel brakes, a single shaft between said front and rear pairs of brakes, a fixed bearing supporting said shaft at one end for axial rotation and pivotal movements and holding same against all other movements with respect thereto, connections between said shaft and the front pair of brakes, connections between said shaft and the rear pair of brakes, means supporting said shaft near its other end and limiting pivotal movements thereof to directions substantially in line with said connections, and means for rotating said shaft to apply the brakes.

4. In a brake mechanism for vehicles, a pair of front wheel brakes, a pair of rear wheel brakes, a single shaft between said front and rear pairs of brakes, a bearing at one end of said shaft supporting same for axial rotation and pivotal movements, said bearing holding said shaft against all other movements with respect thereto, two pairs of arms located at spaced points along said shaft and extending in opposite directions therefrom respectively, connections between said arms and said brakes, and means for rotating said shaft.

In testimony whereof I hereunto affix my signature.

GEORGE L. SMITH.